United States Patent
Ashok et al.

(10) Patent No.: US 10,839,568 B2
(45) Date of Patent: Nov. 17, 2020

(54) GENERATION OF DEWARPED OCT B-SCAN IMAGES

(71) Applicant: Optos Plc, Scotland (GB)

(72) Inventors: Praveen Ashok, Dunfermline (GB); Daniel Hurst, Scotland (GB); Alan Anderson, Scotland (GB)

(73) Assignee: OPTOS PLC, Scotland (GB)

( * ) Notice: Subject to any disclaimer, the term of this patent is extended or adjusted under 35 U.S.C. 154(b) by 0 days.

(21) Appl. No.: 16/375,152

(22) Filed: Apr. 4, 2019

(65) Prior Publication Data
US 2020/0320754 A1 Oct. 8, 2020

(51) Int. Cl.
*G06T 11/00* (2006.01)
*G06T 5/00* (2006.01)
*G06T 3/40* (2006.01)

(52) U.S. Cl.
CPC .............. *G06T 11/008* (2013.01); *G06T 3/40* (2013.01); *G06T 5/002* (2013.01); *G06T 2207/10101* (2013.01); *G06T 2210/41* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,357,208 B2* | 5/2016 | Gupta | ................... | H04N 17/00 |
| 9,609,197 B1* | 3/2017 | Stepanenko | ....... | H04N 5/23238 |
| 9,875,520 B1* | 1/2018 | Stepanenko | ............ | G06T 5/006 |
| 10,572,982 B2* | 2/2020 | Beric | ................. | H04N 5/23229 |
| 2014/0333729 A1* | 11/2014 | Pflug | ..................... | G06T 15/20 |
| | | | | 348/47 |
| 2015/0049193 A1* | 2/2015 | Gupta | ................... | G06T 3/4038 |
| | | | | 348/148 |

* cited by examiner

*Primary Examiner* — Zhiyu Lu
(74) *Attorney, Agent, or Firm* — DeLucia, Mlynar & Alicandro LLP

(57) ABSTRACT

A method of generating a look-up table, LUT, for constructing a dewarped B-scan image from A-scans of a cropped part of a sequence of acquired OCT A-scans, the LUT associating each of a plurality of pixel arrays that are to form the dewarped B-scan image with a respective A-scan in the cropped part. The method comprises: using an indication of a spatial distribution of scan locations of A-scans to determine a dewarp function for selecting, from among acquired A-scans, A-scans having uniformly spaced scan locations; using the function and cropping information, in accordance with which the cropped part is cropped from the acquired sequence, to select, for each array, a respective A-scan from the sequence such that A-scans are selected from the cropped part and have uniformly spaced scan locations; and storing, for each array, a respective pixel array identifier in association with a respective identifier of the selected A-scan.

15 Claims, 12 Drawing Sheets

| Column ID | 1 | 2 | ... | $\frac{N}{2}$ | $\frac{N}{2}+1$ | ... | $\frac{3N}{2}-1$ | $\left(\frac{3N}{2}\right)$ | ... | 2N-1 | 2N |
|---|---|---|---|---|---|---|---|---|---|---|---|
| A-scan ID | F(1) | F(2) | ... | $F\left(\frac{N}{2}\right)$ | $F\left(\frac{N}{2}+1\right)$ | ... | $F\left(\frac{3N}{2}-1\right)$ | $F\left(\frac{3N}{2}\right)$ | ... | F(2N-1) | F(2N) |

Fig. 6(a)

| Column ID | 1 | 2 | ... | N-1 | N |
|---|---|---|---|---|---|
| A-scan ID | $F\left(\frac{N}{2}\right)$ | $F\left(\frac{N}{2}+1\right)$ | ... | $F\left(\frac{3N}{2}-1\right)$ | $F\left(\frac{3N}{2}\right)$ |

Fig. 6(b)

GENERATION OF DEWARPED OCT B-SCAN IMAGES

FIELD

Example aspects herein generally relate to the field of Optical Coherence Tomography (OCT) data processing and, in particular, to the generation of dewarped OCT B-scan images.

BACKGROUND

OCT imaging provides a valuable diagnostic tool whose use had been widely adopted in many medical fields, including ophthalmology, cardiology and oncology, for example. The presentation of acquired OCT data in the form of a B-scan image is often particularly valuable to medical practitioners, as this effectively provides a sectional view through the interior of a body part such the retina or a blood vessel. B-scans are normally obtained by combining a set of axial scans (A-scans) in the order in which they were acquired by an OCT imaging device. Distortions in the B-scan image, such as a horizontal warping in the periphery of the image that is often observed as a scan artefact, are conventionally corrected for by applying appropriate distortion corrections to the B-scan image using known image processing techniques. There remains, however, a need to find a way of generating dewarped B-scan images in a more computationally efficiency way.

SUMMARY

The present inventors have devised, in accordance with a first example aspect herein, a computer-implemented method of generating a look-up table for constructing a dewarped B-scan image from A-scans of a cropped part of a sequence of A-scans acquired by an optical coherence tomography, OCT, imaging apparatus, the look-up table associating each of a plurality of pixel arrays that are to form the dewarped B-scan image with a respective one of the A-scans in the cropped part of the sequence of A-scans. The method comprises receiving an indication of a spatial distribution of scan locations of the A-scans acquired by the OCT imaging apparatus, and cropping information in accordance with which the cropped part of the sequence of A-scans is cropped from the sequence of A-scans acquired by the OCT imaging apparatus. The method further comprises using the received indication to determine a dewarp function for selecting, from among the A-scans acquired by the OCT imaging apparatus, A-scans that have been acquired at substantially uniformly spaced scan locations. The method further comprises using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced, and storing, for each of the pixel arrays, a respective pixel array identifier of the pixel array in association with a respective A-scan identifier of the selected A-scan.

The present inventors have further devised, in accordance with a second example aspect herein, a non-transitory storage medium storing computer-readable instructions which, when executed by a processor, cause the processor to perform a method of generating a look-up table for constructing a dewarped B-scan image from A-scans of a cropped part of a sequence of A-scans acquired by an optical coherence tomography, OCT, imaging apparatus, the look-up table associating each of a plurality of pixel arrays that are to form the dewarped B-scan image with a respective one of the A-scans in the cropped part of the sequence of A-scans. The method comprises receiving an indication of a spatial distribution of scan locations of the A-scans acquired by the OCT imaging apparatus, and cropping information in accordance with which the cropped part of the sequence of A-scans is cropped from the sequence of A-scans acquired by the OCT imaging apparatus. The method further comprises using the received indication to determine a dewarp function for selecting, from among the A-scans acquired by the OCT imaging apparatus, A-scans that have been acquired at substantially uniformly spaced scan locations. The method further comprises using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced, and storing, for each of the pixel arrays, a respective pixel array identifier of the pixel array in association with a respective A-scan identifier of the selected A-scan.

The present inventors have also devised, in accordance with a third example aspect herein, an apparatus configured to generate a look-up table for constructing a dewarped B-scan image from A-scans of a cropped part of a sequence of A-scans acquired by an OCT imaging apparatus, wherein the look-up table associates each of a plurality of pixel arrays that are to form the dewarped B-scan image with a respective one of the A-scans in the cropped part of the sequence of A-scans. The apparatus comprises a receiver module configured to receive an indication of a spatial distribution of scan locations of the A-scans acquired by the OCT imaging apparatus, and cropping information in accordance with which the cropped part of the sequence of A-scans is cropped from the sequence of A-scans acquired by the OCT imaging apparatus. The apparatus further com- prises a dewarp function generator module configured to use the received indication to determine a dewarp function for selecting, from among the A-scans acquired by the OCT imaging apparatus, A-scans that have been acquired at substantially uniformly spaced scan locations. The apparatus further comprises a look-up table generator module configured to generate the look-up table by using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced, and by storing in a memory, for each pixel array of the pixel arrays, a respective pixel array identifier of the pixel array in association with a respective A-scan identifier of the selected A-scan.

BRIEF DESCRIPTION OF THE DRAWINGS

Example embodiments herein will now be explained in detail, by way of non-limiting example only, with reference to the accompanying figures described below. Like reference numerals appearing in different ones of the figures can denote identical or functionally similar elements, unless indicated otherwise.

FIGS. 6(a) and 6(b) illustrate examples of an uncropped look-up table and a cropped look-up table, respectively, generated according to the first example embodiment.

DETAILED DESCRIPTION OF EMBODIMENTS

Example embodiments herein will now be described in detail with reference to the accompanying drawings.

Embodiment 1

Figure 1:
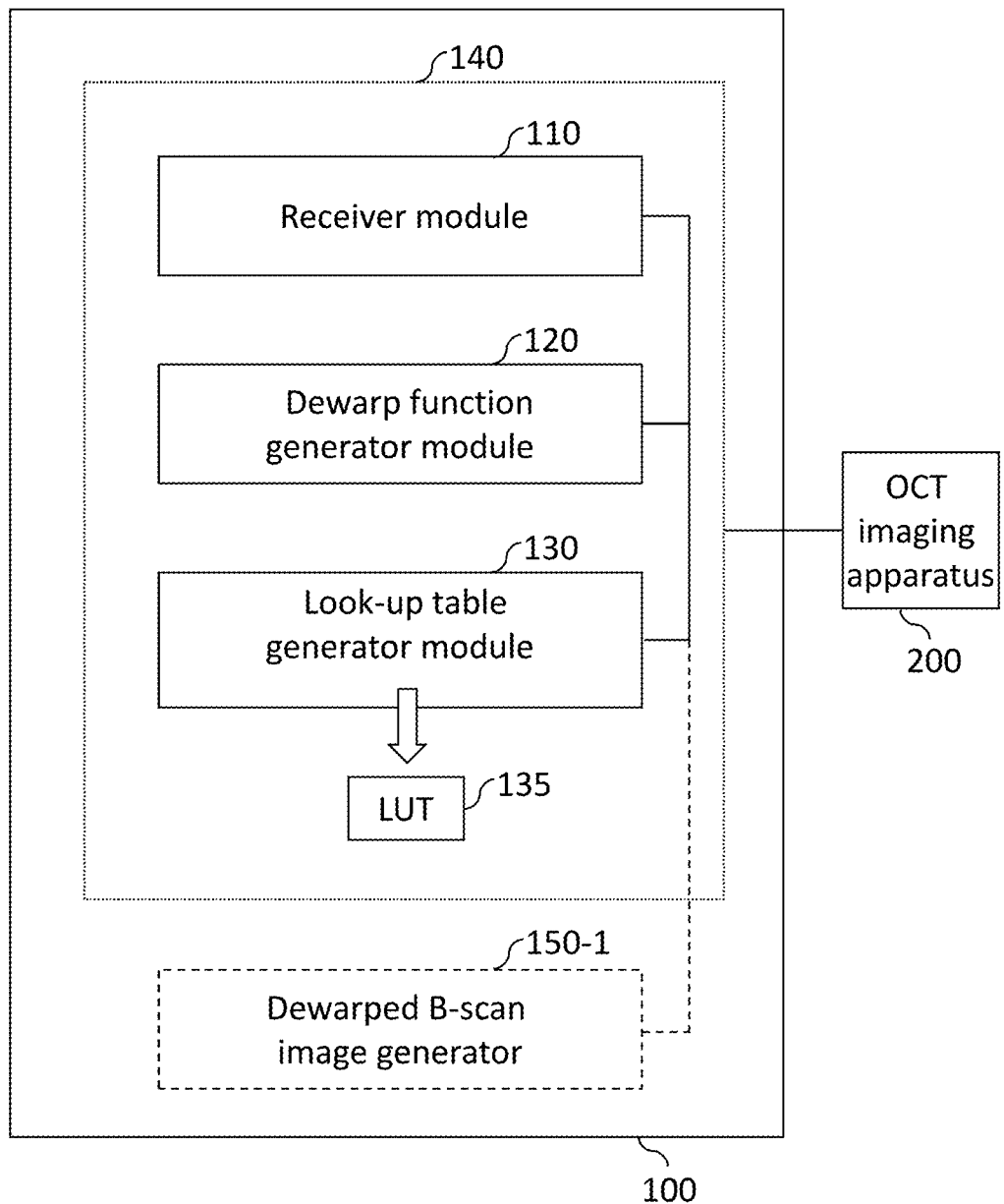
FIG. 1 is a schematic illustration of an apparatus according to a first example embodiment herein, which is configured to generate a look-up table for constructing a dewarped B-scan image from A-scans of a cropped part of a sequence of A-scans acquired by an OCT imaging apparatus, wherein the OCT imaging apparatus also is shown coupled to the apparatus.

FIG. 1 is a schematic illustration of an apparatus 100 according to a first example embodiment herein, which is configured to generate a look-up table for constructing a dewarped B-scan image from A-scans of a sequence of A-scans acquired by an OCT imaging apparatus 200 in a highly efficient way. As will be explained in the following, the look-up table provides a single-step transformation which takes into account two different approaches to scan artefact removal and is well-suited to parallelisation, allowing image quality to be significantly improved in a computationally efficient way.

The look-up table may be used in a variety of different OCT imaging applications to construct B-scans from acquired A-scans, for example (and without limitation) in ophthalmic OCT to obtain cross-sectional views of the retina and anterior segment of the eye for diagnosing various eye diseases or systemic pathologies, in intravascular OCT (IVOCT) to obtain cross-sectional images of an artery lumen and wall for guiding percutaneous coronary interventions (PCI) and assessing their outcomes, and in endoscopic OCT of organs such as the oesophagus to obtain cross-sectional views for diagnosing cancer and the like. In all these OCT imaging applications, the OCT imaging apparatus 200 acquires a sequence of A-scans such that the A-scans are arranged in an order in which they were sampled in time, each A-scan having been obtained at a respective scan location on a surface of a body part being imaged. The data elements constituting the A-scan recorded at each scan location may represent measured values of an interference signal generated by interfering a sample beam from a sample arm of the OCT imaging apparatus 200 with light from a reference arm of the OCT imaging apparatus 200 as the optical path length in the reference arm is varied incrementally, thereby probing the body part at a corresponding set of locations along the axial direction of the sample beam which correspond to the elements of the A-scan.

Scan location is typically varied during acquisition of a sequence of A-scans by changing a deflection angle of an OCT sample beam via rotation of at least one scanning element 210 (e.g. a mirror galvanometer in the case of a retinal OCT imaging system, or a rotating probe in the case of IVOCT).

For each recorded A-scan, the OCT imaging apparatus 200 forms an association (for example, by storage in an appropriately configured data structure, which may be visualised as a table or the like) between the A-scan data of an A-scan and a value of a scan control parameter (for example, a control signal for controlling the angular displacement of the scanning element 210) that is indicative of the corresponding scan location. As an example, in an embodiment where the OCT imaging apparatus 200 comprises a scanning element 210 which is arranged so as to allow the OCT sample beam to be scanned across a subject's retina (as an example of the body part) by control of its rotation, the OCT imaging apparatus 200 may form an association between each A-scan, $A_i$, (where i=1, . . . N in case of N A-scans being recorded), and corresponding values, $D_\theta(i)$, of a drive signal, $D_\theta$, according to which the scanning element 210 is set when A-scan i is recorded, the value $D_\theta(i)$ thus being indicative of the location of the A-scan i on the retina. The locations at which the OCT sample beam impinges on the retina during the performance of an OCT scan may be calculated as a function of the angular displacement of the scanning element 210, and therefore as a function of $D_\theta$ (based on a calculated or measured response of the scanning element's angular displacement to the drive signal $D_\theta$), using an optical model of the OCT imaging system and the eye being imaged thereby, for example.

If the scanning of the sample beam is performed by using a drive signal in the form of a linear ramp to control the rotation of the scanning element 210, then the scan locations of A-scans in the acquired sequence of A-scans may be distributed on the surface of the body so as to have spacing between adjacent scan locations that is uniform to a good approximation. In this case, simply arranging adjacent A-scans may be sufficient to generate a B-scan. In other words, a B-scan image substantially free of (horizontal or vertical) warping caused by scan artefacts could be obtained under these circumstances by mapping the A-scans in the sequence of A-scans to corresponding arrays (columns or, as the case may be, rows) of pixels of an image frame that is to form the B-scan image, and setting the value of each pixel so as to be indicative of the value of the corresponding A-scan element.

In most practical applications, however, a periodic drive signal is typically used to drive the scanning element 210. To perform linear optical sampling using the OCT imaging apparatus, the scanning element 210 could, in principle, be driven using a symmetric saw-tooth drive signal. Due to their inertial response, some types of scanners (e.g. non-resonant galvo) may not be able to respond to the high-frequency components at the turning points of such a drive signal. This would cause an effective deceleration and acceleration in the response of the scanning element 210 at the turning points of the drive signal. To avoid aggressive driving of the scanning element 210, the scanning element 210 could alternatively be driven using a sinusoidal drive signal. However, in both cases (saw-tooth drive or sinusoidal drive), A-scans acquired at a constant A-scan acquisition frequency would have corresponding scan locations that are not uniformly distributed on the surface of the body part, which would introduce a horizontal warping artefact in the B-scan if the A-scans were simply combined as described above because the display assumes a constant pixel spacing.

In accordance with the present example embodiment, such warping artefacts can be removed in a highly efficient way, by using a single-step transformation in the form of a look-up table for mapping each pixel array of a plurality of pixel arrays (i.e. rows or columns of pixels), which are to form a dewarped B-scan image, to a respective A-scan that has been selected from the sequence of A-scans using a dewarp function and cropping information as described herein. The look-up table generated according to the scheme described herein allows A-scans derived only from a cropped part of the acquired sequence of A-scans, thus allowing regions of the kind noted above, in which non-linear sampling occurs that may be difficult to model accurately, to be disregarded in the construction of the B-scan image. Furthermore, the look-up table allows A-scans, which are derived from the remaining cropped part of the acquired sequence of A-scans and are substantially uniformly spaced apart from one another, to be selected for assembly into the B-scan image, which can consequently be substantially free of distortions. Moreover, B-scan image construction utilising the look-up table of the present example embodiment naturally lends itself to parallelisation in processing hardware such as a field-programmable gate array (FPGA), conferring yet further processing speed advantages over conventional approaches to generating dewarped OCT B-scan images.

Figure 2:
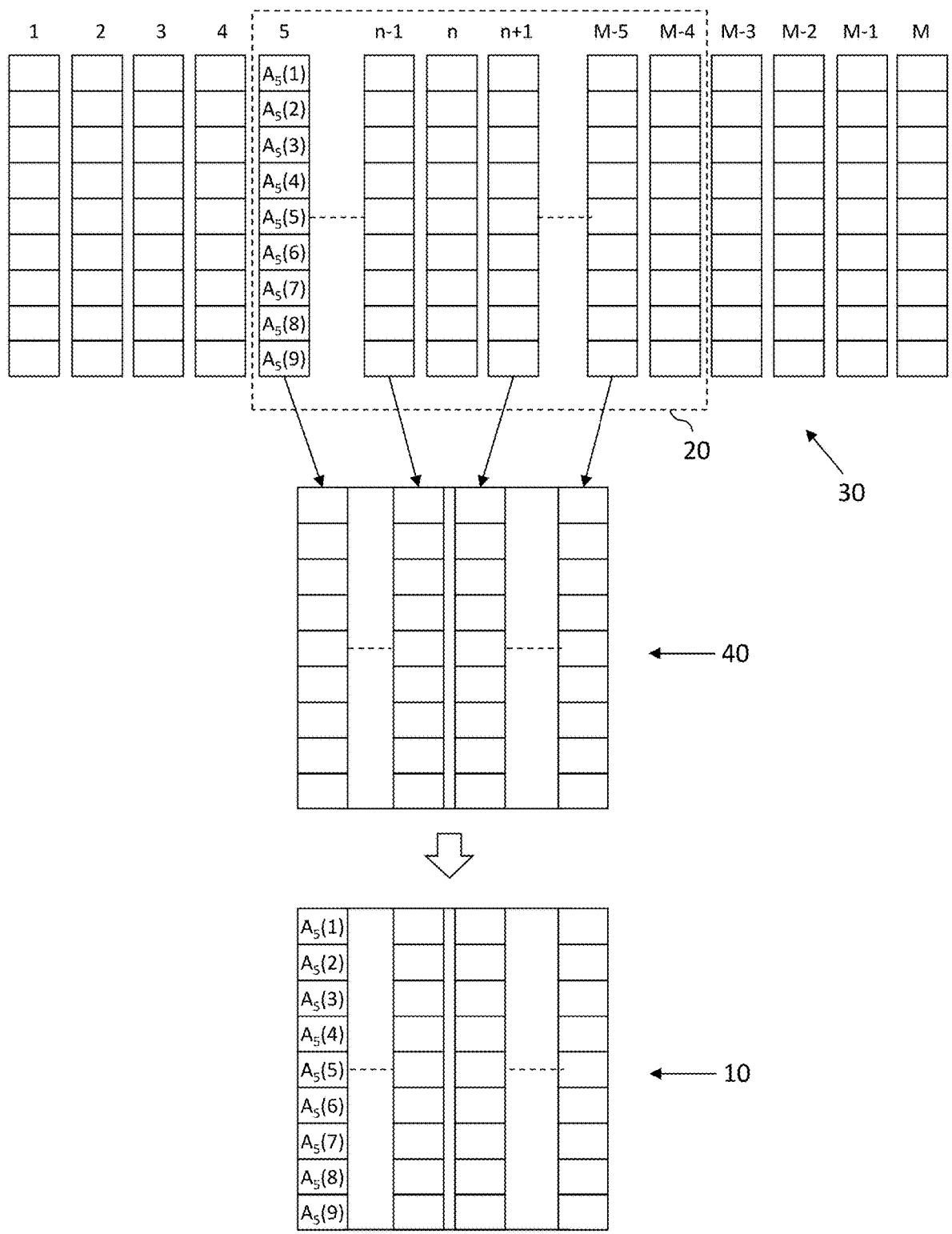
FIG. 2 is a schematic illustration of the construction of a dewarped B-scan image from a cropped part of a sequence of A-scans.

The apparatus 100 of the present embodiment is thus configured to generate a look-up table for constructing, as shown schematically in FIG. 2, a dewarped B-scan image 10 from A-scans of a cropped part 20 of a sequence of (M) A-scans 30 acquired by the OCT imaging apparatus 200 at respective scan locations on a surface of the body part being imaged by the OCT imaging apparatus 200. The look-up table associates each of a plurality of pixel arrays (forming a two-dimensional array of pixels 40) that are to form the dewarped B-scan image 10 with a respective one of the A-scans in the cropped part 20 of the sequence of A-scans 30. In the present example embodiment, the pixels arrays are columns of the two-dimensional array of pixels 40 that is to form the B-scan image 10, although the pixels arrays may alternatively be the rows of this two-dimensional array of pixels. As will be explained in the following, the two-dimensional array of pixels 40 may be populated with pixel data that is based on A-scans which have been selected using the look-up table. In the example of FIG. 2, the data elements $A_n$ from the selected A-scan are copied into the pixels of the corresponding pixel column of the two-dimensional array of pixels 40. Although only the copying of data elements $A_5(1)$ to $A_5(9)$ from the fifth A-scan in the sequence of A-scans into the corresponding first column of the two-dimensional array of pixels 40 is illustrated in FIG. 2, the data elements of the remaining selected A-scans in the cropped part 20 are/can be similarly copied into the corresponding columns of the two-dimensional array of pixels 40. It is also noted that the number of elements in the A-scans is not limited to nine, as illustrated in FIG. 2.

As illustrated schematically in FIG. 1, the apparatus 100 comprises a receiver module 110, a dewarp function generator module 120, and a look-up table generator module 130 for generating look-up table 135, which together form a look-up table generator 140. The apparatus 100 may, as in the present example embodiment, also include a dewarped B-scan image generator 150-1, which is configured to use the generated look-up table 135 to construct the dewarped B-scan image by processing the acquired sequence of A-scans as described below. The receiver module 110, the dewarp function generator module 120, the look-up table generator module 130 and (where provided) the dewarped B-scan image generator 150-1 are communicatively coupled by any appropriate communication channel 160 (such as a data bus or the like) so as to be capable of exchanging data with one another, as described in more detail below.

The dewarped B-scan image generator 150-1 may, as in the present example embodiment, be provided in the form of an FPGA, which may allow the dewarped B-scan image to be constructed from the acquired A-scans in a computationally efficient way, as described below. It should be noted, however, that the dewarped B-scan image generator 150-1 may alternatively be implemented in another form, such as any processor capable of performing the operations of the dewarped B-scan image generator 150-1 on required timescales, such as a CPU or a GPU.

Figure 3:
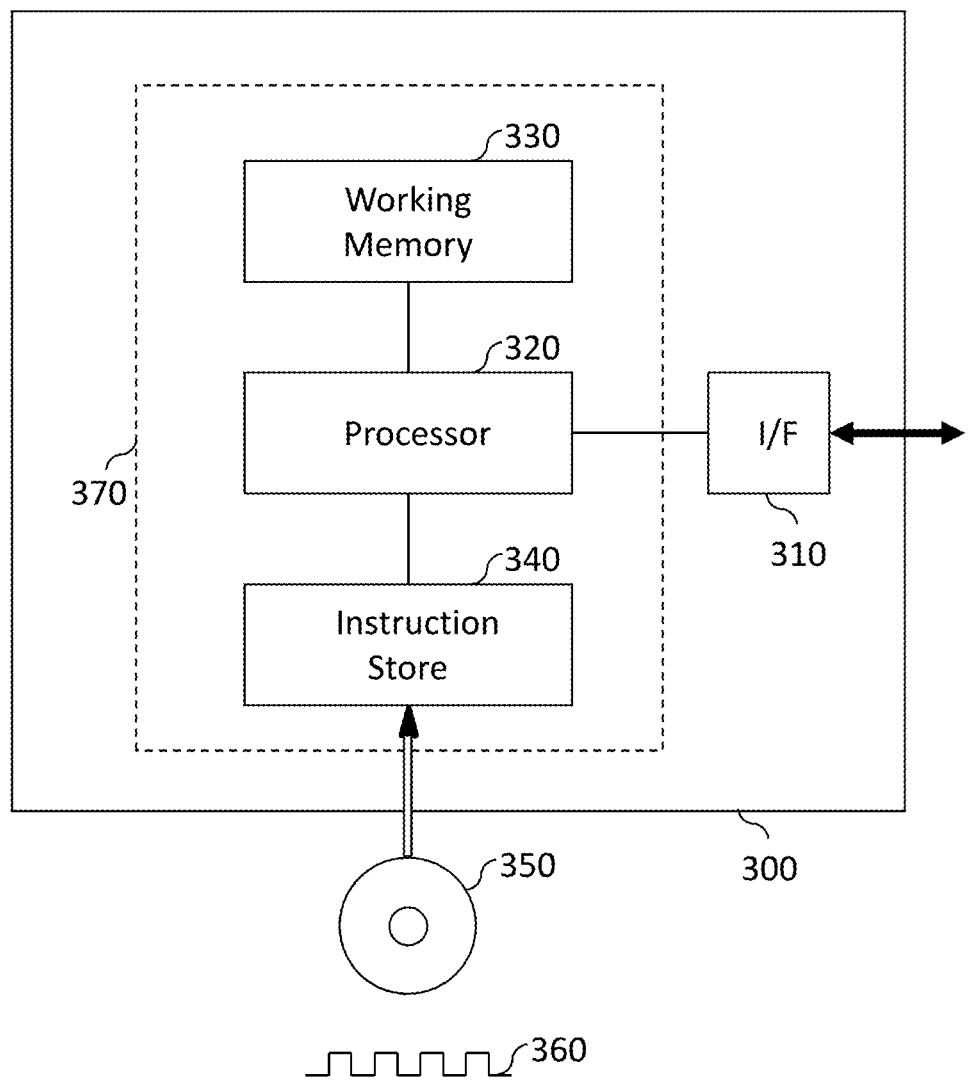
FIG. 3 is a block diagram illustrating an example signal processing hardware configuration of the look-up table generator 140 of the apparatus 100 illustrated in FIG. 1.

The look-up table generator 140 may, as in the present example embodiment, be provided in the form of an appropriately configured programmable signal processing hardware 300, as illustrated schematically in FIG. 3. The programmable signal processing hardware 300 comprises a communication interface (I/F) 310 for receiving information including an indication of a spatial distribution of scan locations of the A-scans acquired by the OCT imaging apparatus 200, and cropping information in accordance with which the cropped part of the sequence of A-scans is cropped from the sequence of A-scans acquired by the OCT imaging apparatus (200), the cropping information indicating a proportion of the sequence of A-scans acquired by the OCT imaging apparatus 200 that is constituted by the A-scans of the part of the sequence of A-scans. The look-up table generator 140 may, as in the present embodiment, tailor the generated look-up table 135 to the number of A-scans acquired by the OCT imaging apparatus 200, so that the communication interface 310 may also receive an indication of the number of acquired A-scans. The communication interface 310 may also receive an indication of the desired width (expressed as a number of pixels) of the dewarped B-scan image to be generated.

The signal processing apparatus 300 further comprises a processor (e.g. a Central Processing Unit, CPU, or Graphics Processing Unit, GPU) 320, a working memory 330 (e.g. a random access memory) and an instruction store 340 storing a computer program 345 comprising the computer-readable instructions which, when executed by the processor 320, cause the processor 320 to perform various functions including those of the receiver module 110, dewarp function generator module 120, and the look-up table generator module 130 described herein. The working memory 330 stores various items of information used by the processor 320 during execution of the computer program 345, including the dewarp function, the selection of A-scans, the pixel array identifiers, the A-scan identifiers and the number of pixels arrays that are to form an uncropped dewarped B-scan image that are described below. The instructions of the computer program 345, when executed by the processor 320, also cause the processor 320 to perform the methods described herein and shown in, for example, FIGS. 4, 5, 8, and 10.

The instruction store 340 may comprise a ROM (e.g. in the form of an electrically-erasable programmable read-only memory (EEPROM) or flash memory) which is pre-loaded with the computer-readable instructions. Alternatively, the instruction store 340 may comprise a RAM or similar type of memory, and the computer-readable instructions of the computer program 345 can be input thereto from a computer program product, such as a non-transitory, computer-readable storage medium 350 in the form of a CD-ROM, DVD-ROM, etc. or a computer-readable signal 360 carrying the computer-readable instructions. In any case, the computer program 345, when executed by the processor 320, causes the processor 320 to execute a method of generating a look-up table as described herein. It should be noted, however, that the receiver module 110, dewarp function generator module 120, and/or the look-up table generator module 130 may alternatively be implemented in non-programmable hardware, such as an application-specific integrated circuit (ASIC). Furthermore, the programmable hardware 300 described above may be further configured to provide the functionality of the dewarped B-scan image generator 150-1.

In the present example embodiment, a combination 370 of the hardware components shown in FIG. 3, comprising the processor 320, the working memory 330 and the instruction store 340, is configured to perform functions of the receiver module 110, the dewarp function generator module 120, and the look-up table generator module 130 described below. The combination 370 of the hardware components may be configured to provide the functionality of the dewarped B-scan image generator 150-1, in an alternative embodiment in which the B-scan image generator 150-1 is not implemented as an FPGA.

Figure 4:
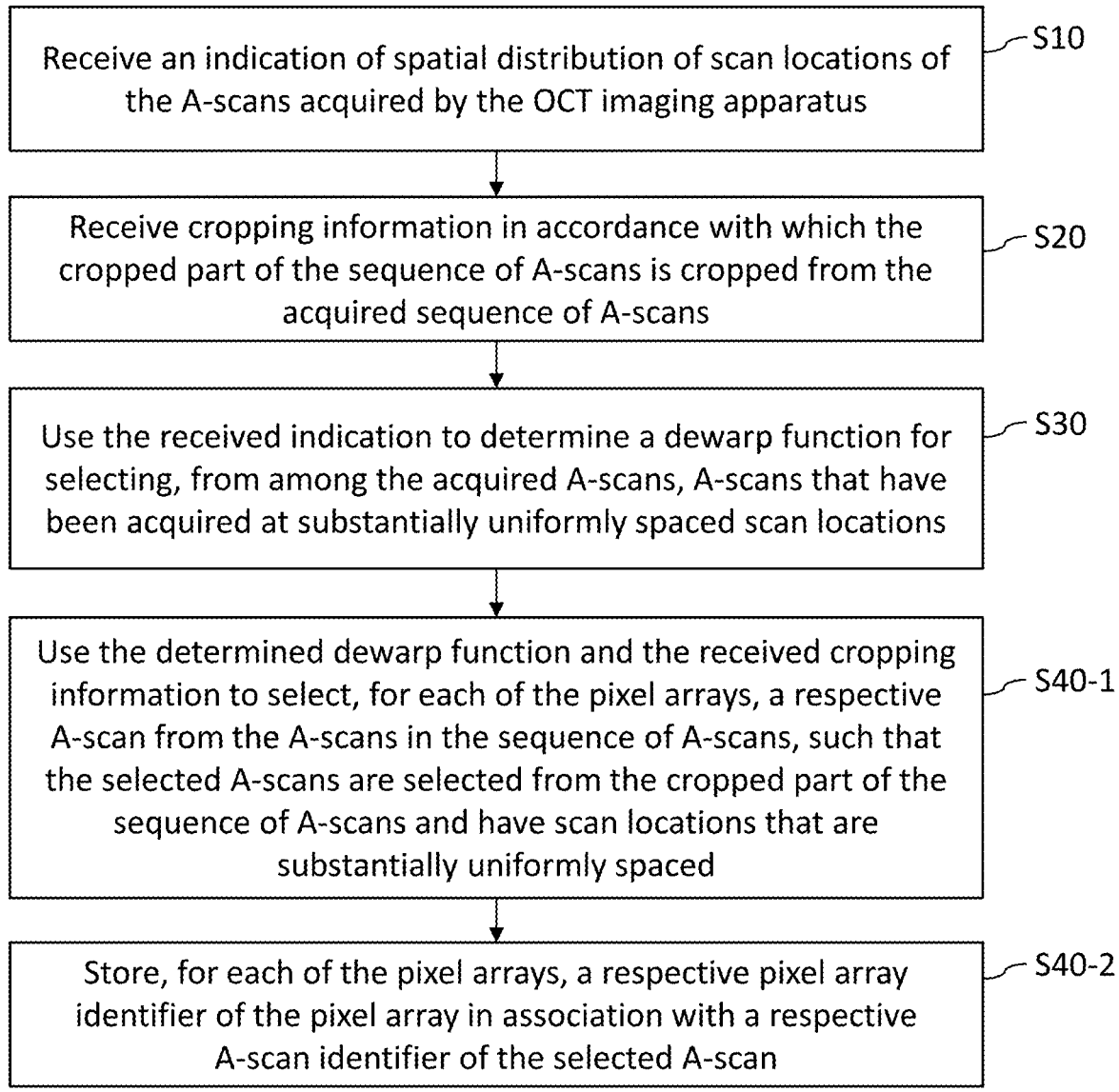
FIG. 4 is a flow diagram illustrating a method of generating a look-up table for constructing a dewarped B-scan image according to the first example embodiment herein.

FIG. 4 is a flow diagram illustrating a method performed by the processor 320, by which the processor 320 generates the look-up table 135 for constructing the dewarped B-scan image from A-scans of the cropped part of a sequence of A-scans acquired by the OCT imaging apparatus 200.

In step S10 of FIG. 4, the receiver module 110 receives an indication of a spatial distribution of scan locations of the A-scans acquired by the OCT imaging apparatus 200.

The look-up table generation described herein may, in general, be implemented as an open loop process or a closed loop process. In embodiments like the present embodiment, in which an open loop is employed, the receiver module 110 may receive in step S10 of FIG. 4, as the indication of the spatial distribution of scan locations of the A-scans acquired by the OCT imaging apparatus 200, values of at least one OCT scan control parameter that determines a scan pattern according to which the OCT imaging apparatus 200 is controlled to acquire the sequence of A-scans. For example, the receiver module 110 may, as in the present example embodiment, receive values of the scanning element drive signal $D_\theta$ mentioned above (or values of two or more such drive signals), for which respective A-scans have been acquired.

The spatial distribution of scan locations of the A-scans acquired by the OCT imaging apparatus 200 could be derived from the received values of De using the (known) response of the scanning element 210 to De and the optical model of the OCT imaging apparatus 200 and the eye, as well as information on the timing according to which A-scans are acquired during the scan (e.g. A-scan acquisition frequency). The spatial distribution of scan locations of the A-scans acquired by the OCT imaging apparatus 200 may follow any curve, such as a line, a circle, an ellipse, a lemniscate or a Lissajous figure, for example.

In a variant of the present example embodiment, which generates the look-up table 135 in a closed loop, the receiver module 110 may receive, as the indication of the spatial distribution of scan locations of the A-scans acquired by the OCT imaging apparatus 200, measurements of a displacement of at least one scanning element 210 of the OCT imaging apparatus 200 that are indicative of respective scan locations of the A-scans acquired by the OCT imaging apparatus 200. For example, the receiver module 110 may receive these measurements indicative of an angular displacement of the scanning element(s) of the OCT imaging apparatus 200 from sensor(s) monitoring the rotation of the scanning element(s) 210, and provide these measurements to the dewarp function generator module 120 to allow the dewarp function to be determined in real-time. The spatial distribution of scan locations of the A-scans acquired by the OCT imaging apparatus 200 could be derived from the measured values using the optical model of the OCT imaging apparatus 200 and the eye mentioned above. In some examples, the closed loop variant may allow a more accurate dewarp function to be determined, although in some cases the real-time look-up table generation may be more processor-intensive.

In step S20 of FIG. 4, the receiver module 110 receives cropping information in accordance with which the cropped part of the sequence of A-scans is cropped from the sequence of A-scans acquired by the OCT imaging apparatus 200, the cropping information indicating a proportion of the sequence of A-scan acquired by the OCT imaging apparatus 200 that is constituted by the A-scans of the part of the sequence of A-scans. For example, in the case of an OCT imaging apparatus having a scanning element whose degree of rotation follows a saw-tooth or sinusoidal variation over time to define a linear scan pattern, it may be desirable to disregard A-scan acquired near the two turning points in any given cycle of this variation, and thus crop the acquired A-scans so as to keep only a fraction of the acquired A-scans that are intermediate the A-scans neighbouring the turning points that are to be excluded, the cropping information in this case effectively specifying the cropping factor. For example, a cropping factor of 0.5 or 50% would mean that half of the A-scans, in a sequence of A-scans that are acquired as the scanning element rotates from one extremum of its oscillation to the other extremum, would be selected to form the cropped part, with the 25% of acquired A-scans on either side of the cropped part being disregarded (for example, as illustrated in FIG. 2).

It should be noted that steps S10 and S20 in FIG. 4 may be performed in reverse order or concurrently.

In step S30 of FIG. 4, the dewarp function generator module 120 uses the received indication of the spatial distribution of scan locations of the A-scans acquired by the OCT imaging apparatus 200 to determine a dewarp function for selecting, from among the A-scans acquired by the OCT imaging apparatus 200, A-scans that have been acquired at substantially uniformly spaced scan locations on the surface of the body part being imaged. The determination of the dewarp function may be understood as a determination of a set of equally-spaced points along a path linking the scan locations at which the A-scans have been acquired, and a selection, for each of these points, of the A-scan whose scan location is closest to that point.

By way of an example, in the present embodiment, the OCT imaging apparatus 200 has a scanning element 210 that is configured to deflect the OCT sample beam over a range of deflection angles as it is driven to rotate in accordance with a sinusoidal drive signal, and the receiver module 100 receives, as the indication of the spatial distribution of the A-scans noted above, an indication that a sinusoidal drive signal is being used. Based on this indication, the dewarp function generator module 120 may select an appropriate dewarp function from a set of pre-stored dewarp functions. In the present example, the selected dewarp function is $F(n)=\text{Round}[M/\eta \cdot \cos^{-1}(1-2n/N)]$, where M is the number of A-scans in the sequence of A-scans acquired by the OCT imaging apparatus 200, N is the number of pixels columns in an uncropped two-dimensional pixel array that is to be populated with OCT A-scan data to form an uncropped dewarped B-scan image, and n is the column index of the column of the uncropped two-dimensional pixel array for which the A-scan numbered F(n) in the acquired sequence of A-scans is to be selected. It should be noted, however, that the dewarp function generator module 120 need not in general determine the dewarp function for look-up table generation by selecting a dewarp function from a set of pre-stored dewarp functions, and could alternatively generate the dewarp function by processing a received representation of the drive signal (or the measured values of the scanning element displacement noted above, as the case may be) using numerical methods.

The receiver module 110 may, as in the present example embodiment, receive after step S30 in FIG. 4 an indication of a number of columns, N, to be provided in the two-dimensional pixel array (in other words, the desired horizontal size in pixels of the B-scan image that is to be constructed from the acquired A-scans), although this indication may alternatively be received before or concurrently with step S30.

In steps S40-1 and S40-2 of FIG. 4, the look-up table generator module 130 generates the look-up table 135. In step S40-1, the look-up table generator module 130 uses the dewarp function determined in step S30 and the cropping information received in step S20 to select, for each of the pixel columns, a respective A-scan from the A-scans in the sequence of A-scans, such that the selected A-scans are selected from the cropped part of the sequence of A-scans and have scan locations that are substantially uniformly spaced. Then, in step S40-2 of FIG. 4, the look-up table generator module 130 stores in the memory 330, for each column of pixels, a respective column identifier of the column in association with a respective A-scan identifier of the selected A-scan.

An example of the process by which the look-up table generator 130 may generate the look-up table 135 in the present example embodiment will now be described in more detail with reference to FIG. 5 and FIGS. 6(*a*) and 6(*b*).

Figure 5:
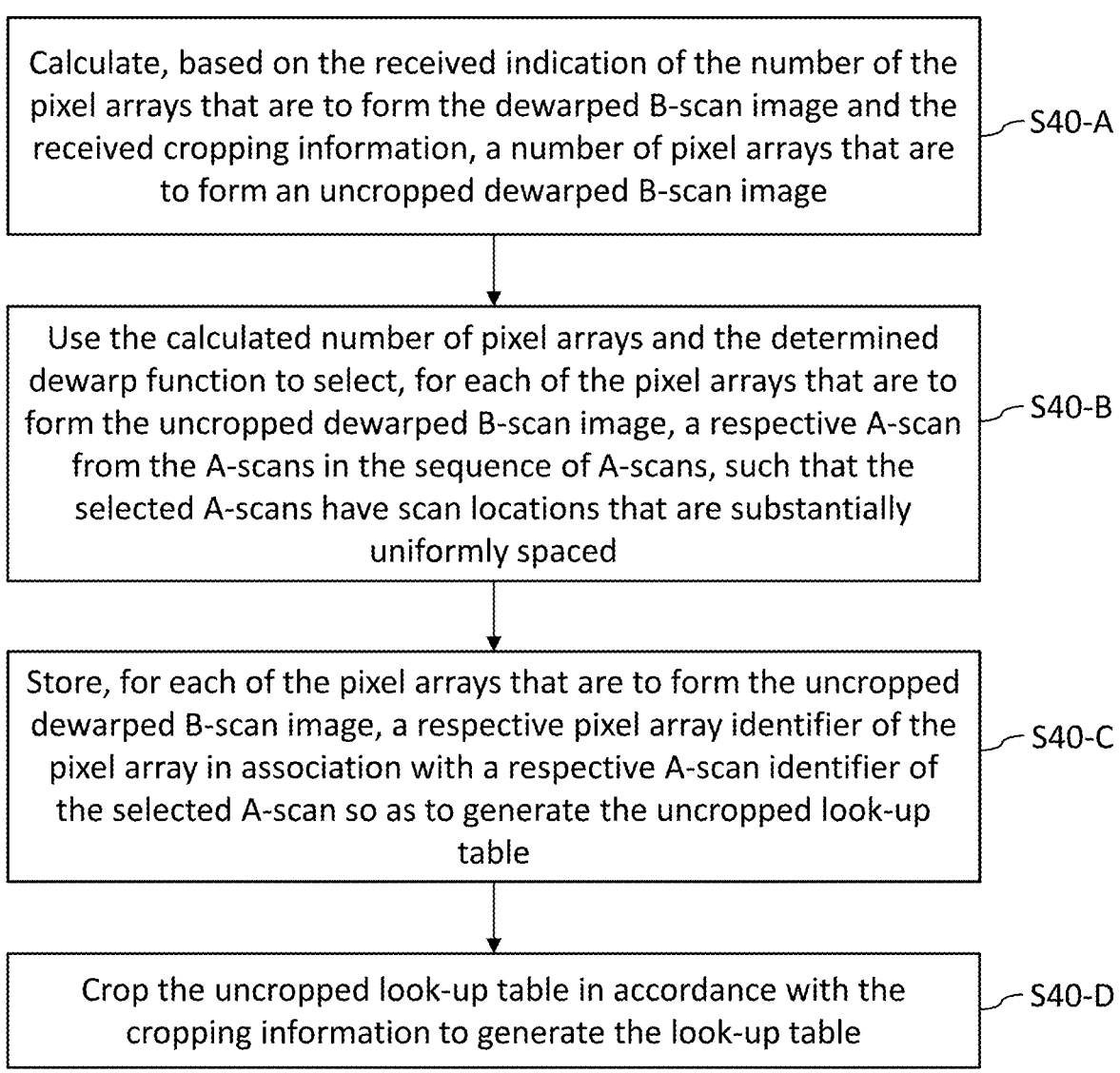
FIG. 5 is a flow diagram showing details of a process by which a look-up table generator 130 of the apparatus of FIG. 1 generates the look-up table in the first example embodiment herein.

Referring firstly to the flow diagram of FIG. 5, the look-up table generator 130 calculates in step S40-A, using the received indication of the number of the pixel columns N that are to form the dewarped B-scan image and the received cropping factor C, a number of pixel columns that are to form an uncropped dewarped B-scan image. The look-up table generator 130 may, as in the present example embodiment, calculate the number of pixel columns that are to form the uncropped dewarped B-scan image by dividing the indicated number of the pixel columns that are to form the dewarped B-scan image by the cropping factor (0.5 in the above example, although another fraction could naturally be used instead, depending on the degree of sampling non-linearity in the end portions of the acquired sequence of A-scans).

In step S40-B of FIG. 5, the look-up table generator 130 uses the calculated number of pixel arrays and the determined dewarp function to select, for each of the pixel columns that are to form an uncropped dewarped B-scan image, a respective A-scan from the A-scans in the sequence of A-scans, such that the selected A-scans have scan locations that are substantially uniformly spaced. Then, in step S40-C of FIG. 5, the look-up table generator 130 stores in the memory 330, for each pixel column of the pixel columns that are to form the uncropped dewarped B-scan image, a respective pixel column identifier of the pixel column in association with a respective A-scan identifier of the selected A-scan, thereby generating the uncropped look-up table.

FIG. 6(*a*) illustrates an uncropped look-up table 135' of the present example embodiment, which stores pixel column identifiers 136, which run from 1 to 2N (as there are N pixel columns in the dewarped B-scan image that is to be constructed, with a cropping factor of 0.5 being assumed in the present embodiment), in association with corresponding A-scan identifiers 137 that are defined by the dewarp function F. Each A-scan identifier identifies the position of the A-scan in the sequence of A-scans acquired by the OCT imaging apparatus 200. As shown in FIG. 6(*a*), the uncropped look-up table 135' has a portion 138 that is to be cropped from the remainder of the uncropped look-up table 135'.

In step S40-D of FIG. 5, the look-up table generator 130 crops the uncropped look-up table 135' in accordance with the cropping factor to generate the look-up table 135. Thus, as illustrated in FIG. 6(*b*), only the portion 138 of the uncropped look-up table 135' is retained (although with the column indices N/2 . . . 3N/2 being replaced with indices 1 . . . N), which can be used to map a respective A-scan (whose location in the sequence of A-scans is defined by the dewarp function F) to each of the N columns of the two-dimensional pixel array that is to form the dewarped B-scan image, with the mapped A-scans all originating from the cropped part of the sequence of A-scans.

It should be noted that the look-up table 135 may alternatively be generated by evaluating a generalised form of the above function F(n), namely a modified dewarp function $F(n, C)=\text{Round}[M/\eta \cdot \cos^{-1}(\cos(n/2 \cdot (1-C))(1-2n/N))]$, where M is the number of A-scans in the sequence of A-scans acquired by the OCT imaging apparatus 200, N is the number of pixels columns in an uncropped two-dimensional pixel array that is to be populated with OCT A-scan data to form an uncropped dewarped B-scan image, C is the cropping factor, and n is the column index of the column of the uncropped two-dimensional pixel array for which the A-scan numbered F(n, C) in the acquired sequence of A-scans is to be selected. In this case, it is unnecessary to generate an uncropped look-up table 135', before cropping it to generate the look-up table 135.

The look-up table 135 generated in the present example embodiment provides a single-step transformation which can effectively provide both a horizontal dewarping and a horizontal cropping of the A-scan data, by resampling non-linearly spaced A-scans to remove warping image artefacts, and discarding A-scans from over-sampled regions of the imaged surface that lie beyond a scan width of interest.

Figure 7:
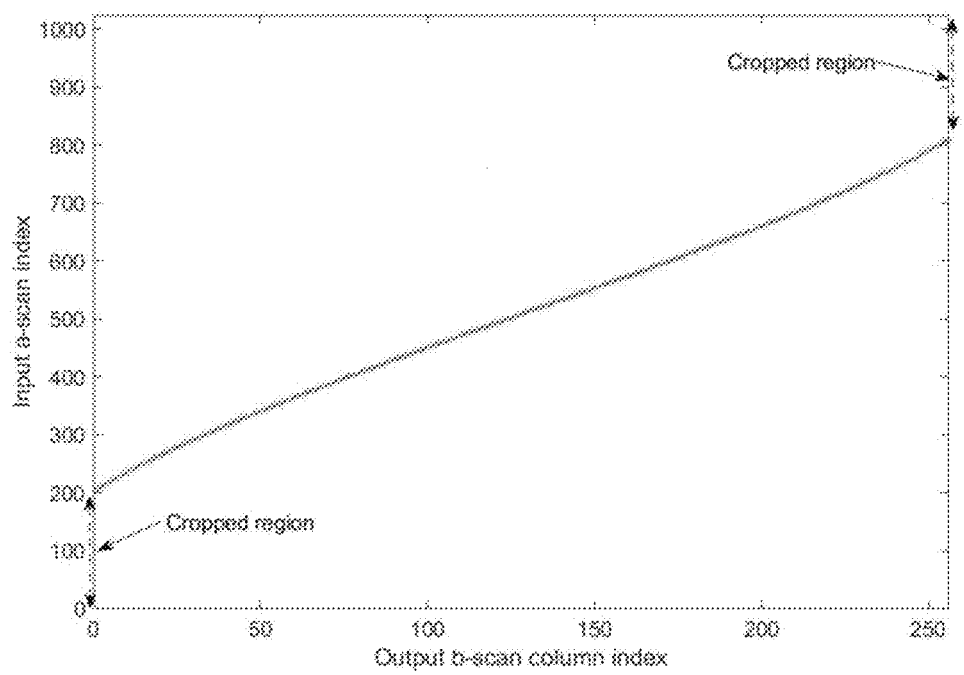
FIG. 7 shows an example of a look-up table generated according to an example embodiment herein, represented in the form of a plot.

An example representation of a look-up table generated by the look-up table generator 140, in the form of a plot, is illustrated in FIG. 7. In this example, M=1024, N=256 and the cropping factor is 0.8, with a cosine dewarp function again being used.

Once the look-up table 135 has been generated by the look-up table generator 140 as described above, it may be communicated to the dewarped B-scan image generator 150-1 and used by the dewarped B-scan image generator 150-1 to construct the dewarped B-scan image on the basis of selected ones of the acquired A-scans.

The process by which the dewarped B-scan image generator 150-1 constructs the dewarped B-scan image in the present example embodiment will now be described with reference to the flow diagram in FIG. 8.

Figure 8:
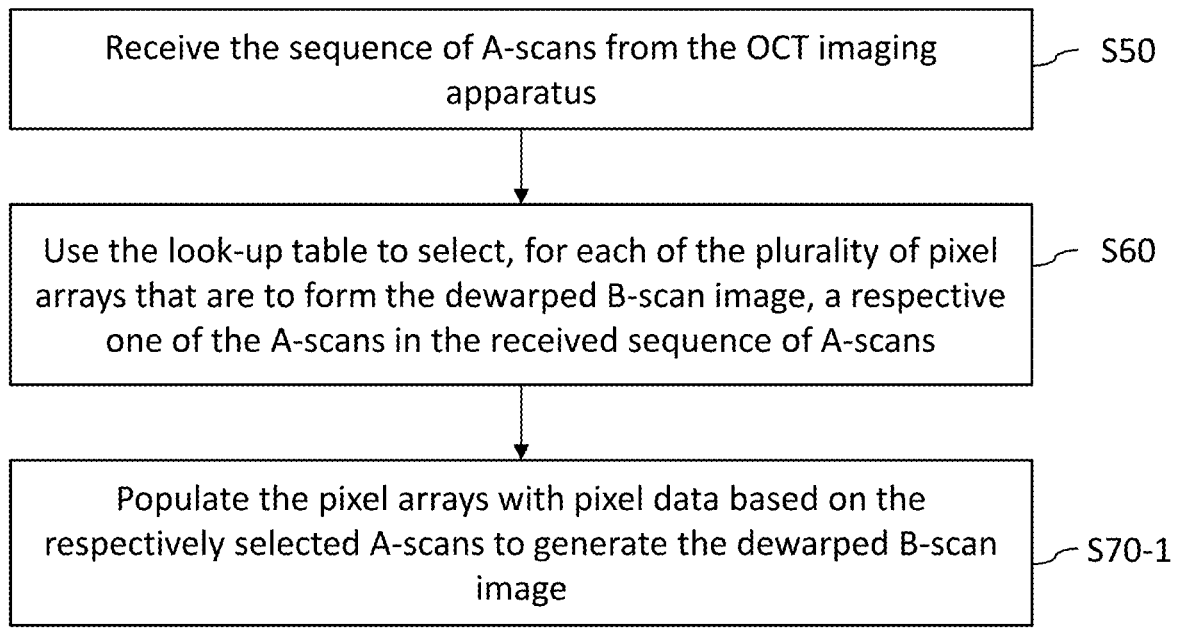
FIG. 8 is a flow diagram illustrating a process by which the dewarped B-scan image is generated in the first example embodiment herein.

In step S50 of FIG. 8, the dewarped B-scan image generator 150-1 receives the sequence of A-scans from the OCT imaging apparatus 200. The dewarped B-scan image generator 150-1 then constructs the dewarped B-scan image from A-scans of the cropped part of the sequence of A-scans as follows.

In step S60 of FIG. 8, the dewarped B-scan image generator 150-1 uses the generated look-up table 135 to select, for each pixel array of the plurality of pixel arrays that are to form the dewarped B-scan image, a respective one of the A-scans in the received sequence of A-scans. In other words, for each pixel column in the two-dimensional pixel array that is to form the dewarped B-scan image, the dewarped B-scan image generator 150-1 looks up the A-scan identifier that is stored in the look-up table 135 in association with the pixel column identifier of that pixel column, and selects the A-scan that is identified by the A-scan identifier.

In step S70-1 of FIG. 8, the dewarped B-scan image generator 150-1 populates the pixel columns with pixel data which is based on the respectively selected A-scans to generate the dewarped B-scan image. The dewarped B-scan image generator 150-1 may, for each pixel column, simply copy the data element values in the selected A-scan into the corresponding pixels of the pixel column (as illustrated in FIG. 2), or it may scale or otherwise process the A-scan element values before populating the pixels in the pixel column with those processed values.

As noted above, the dewarped B-scan image generator 150-1 may, as in the present example embodiment, be implemented in the form of an FPGA that is configured to perform the B-scan image construction using the look-up table 135. Particularly in applications where large amount of data generated by the OCT imaging apparatus 200 needs to be processed quickly to produce a B-scan, the processing block in the FPGA is preferably parallelized to achieve faster processing, and this can be achieved by instantiating the processing block in the FPGA multiple times, each instance generating a different section of the output B-scan. All of the instances would run in parallel to achieve faster processing than would be achieved using sequential processing, by a CPU for example. The FPGA may therefore, as in the present example embodiment, use the look-up table 135 to construct the dewarped B-scan image from A-scans of the cropped part of the sequence of A-scans by performing in parallel, for each of a plurality of sets of pixel columns that are to form the dewarped B-scan image, processes of: using the generated look-up table 135 to select, for each pixel column in the set of pixel columns, a respective one of the A-scans in the received sequence of A-scans; and populating the pixel columns in the set of pixel columns with pixel data based on the respectively selected A-scans to generate a respective section of the dewarped B-scan image. The FPGA then combines the sections of the dewarped B-scan image that have thus been generated in parallel so as to obtain the dewarped B-scan image.

It should be noted that, although the apparatus 100 is illustrated in FIG. 1 as a separate item of hardware to the OCT imaging apparatus 200, the apparatus 100 may alternatively form part of the OCT imaging apparatus 200 and, in particular, form at least a part of the processing resources (CPU, memory etc.) of the OCT imaging apparatus 200.

Embodiment 2

Figure 9:
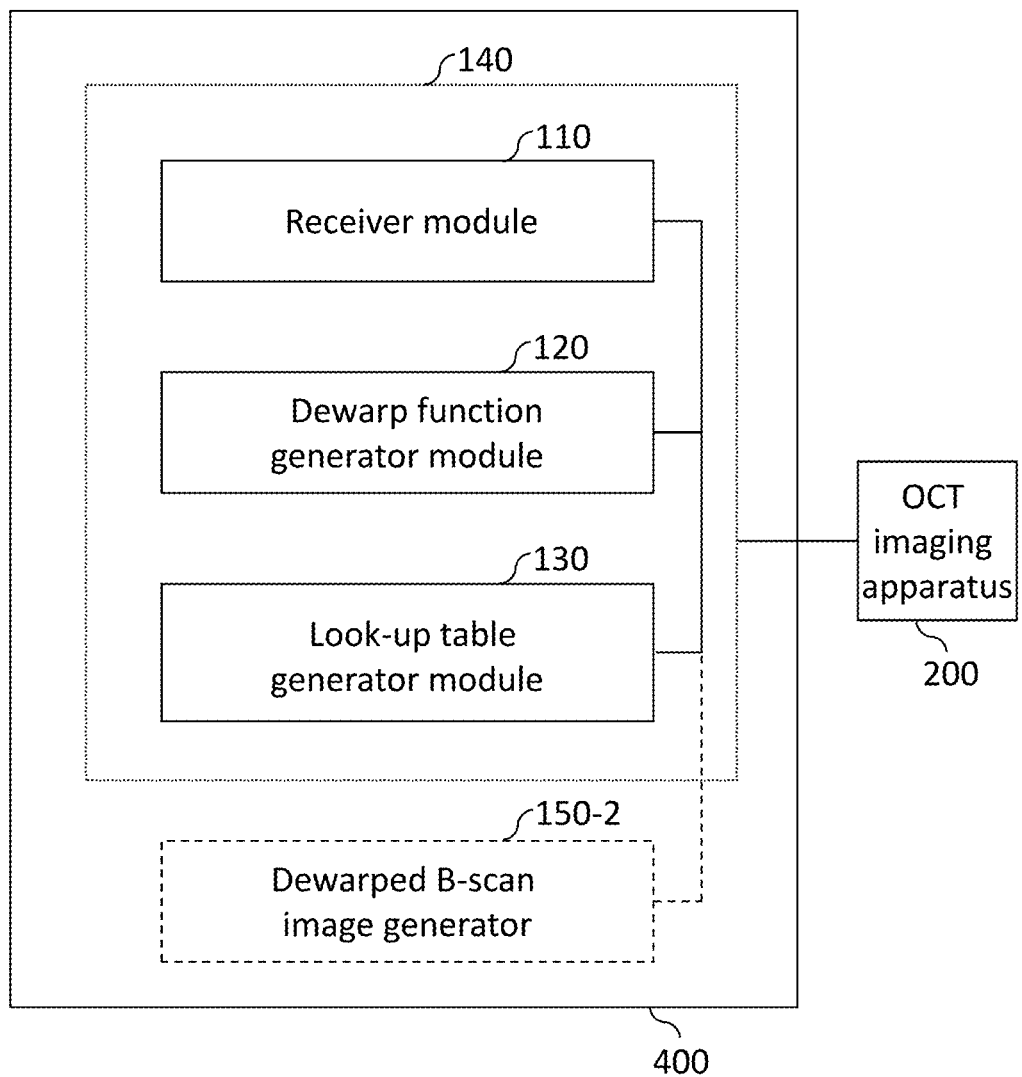
FIG. 9 is a schematic illustration of an apparatus according to a second example embodiment herein, which is configured to generate a look-up table for constructing a dewarped B-scan image from A-scans of a cropped part of a sequence of A-scans acquired by an OCT imaging apparatus, wherein the OCT imaging apparatus also is shown coupled to the apparatus.

FIG. 9 is a schematic illustration of an apparatus 400 according to a second example embodiment herein, which differs from the first example embodiment by the configuration of the dewarped B-scan image generator 150-2, all other components of the apparatus 400 being the same as those of apparatus 100 of the first example embodiment.

In the first example embodiment, the dewarped B-scan image generator 150-1 populates the pixel columns of the two-dimensional pixel array with pixel data that is based on the respectively selected A-scans to generate the dewarped B-scan image, for example by simply copying the data element values in the selected A-scan into the corresponding pixels of the pixel column. The resulting image decimation may, however, lead to a reduced image quality.

In the present example embodiment, a horizontal image downsizing is performed to enhance the B-scan image quality through linear or non-linear neighbouring A-scan averaging. The horizontal image downsizing is effective especially when the A-scan sampling density (i.e. the A-scan pitch as taken along the surface of the retina or other body part being imaged) is higher than the optical resolution of the OCT imaging apparatus 200. As the A-scans being averaged are sampled closely in time, motion-induced averaging artefacts are much smaller in the present example embodiment than, for example, where an attempt is made to improve image quality, through enhanced signal-to-noise ratio (SNR), by simply averaging a plurality of B-scan images.

The process by which the dewarped B-scan image generator 150-2 constructs the dewarped B-scan image in the present example embodiment will now be described with reference to the flow diagram in FIG. 10.

Figure 10:
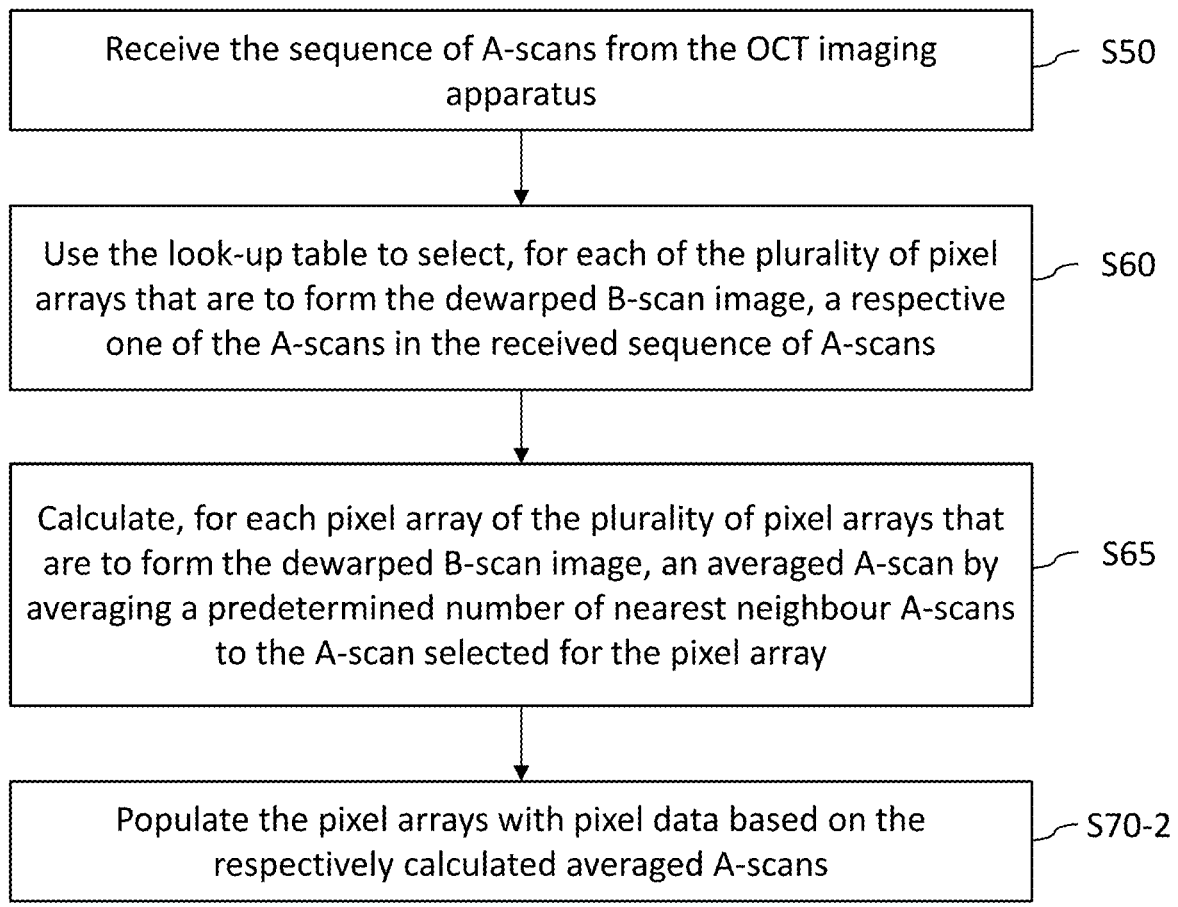
FIG. 10 is a flow diagram illustrating a process by which the dewarped B-scan image is generated in the second example embodiment herein.

In FIG. 10, steps S50 and S60 are the same as those in FIG. 8 of the first example embodiment, and their description will therefore not be repeated here.

In step S65 of FIG. 10, the dewarped B-scan image generator 150-2 calculates, for each pixel column of the plurality of pixel columns that are to form the dewarped B-scan image, an averaged A-scan by averaging a predetermined number of nearest neighbour A-scans to the A-scan selected for the pixel column. To achieve this, the dewarped B-scan image generator 150-2 may convolve a kernel with the acquired A-scans to achieve an averaged downsizing, which would preserve the transverse resolution of the B-scan image and enhance its SNR.

Figure 11:
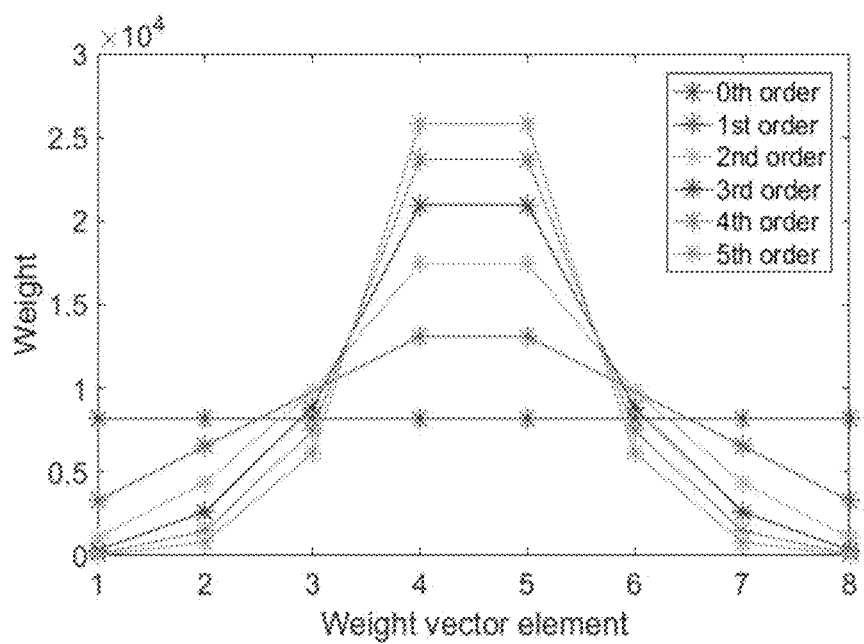
FIG. 11 shows example of normalised weight vectors calculated for different orders of smoothing, which may be used in averaging of A-scans in the second example embodiment herein.

The averaged A-scan may, as in the present example embodiment, be calculated, for each of the pixel columns, as a weighted average of the predetermined number of nearest neighbour A-scans to the A-scan selected for the pixel column. The kernel may therefore be a normalised and symmetric weight vector containing weights to be applied to the nearest A-scans while performing A-scan to A-scan averaging. Depending on the amount of smoothing required and depending on the over-sampling performed compared to optical resolution, the weight of each element in the kernel may be optimised. The length of the kernel is another parameter that can be optimised. FIG. 11 shows example of normalised weight vectors, calculated for different orders of smoothing.

Referring again to FIG. 10, in step S70-2, the dewarped B-scan image generator 150-2 populates the pixel columns with pixel data based on the respectively calculated averaged A-scans. The dewarped B-scan image generator 150-2 may, for each pixel column, simply copy the calculated average values into the corresponding pixels of the pixel column, or it may scale or otherwise process the calculated average values before populating the pixels in the pixel column with those processed values.

Figure 12A:
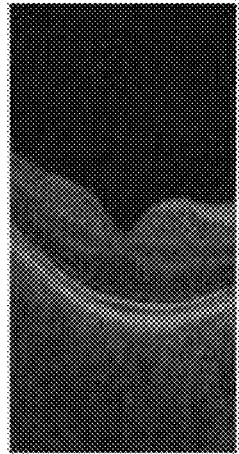
FIG. 12(a) shows a B-scan image generated in accordance an embodiment herein.
Figure 12B:
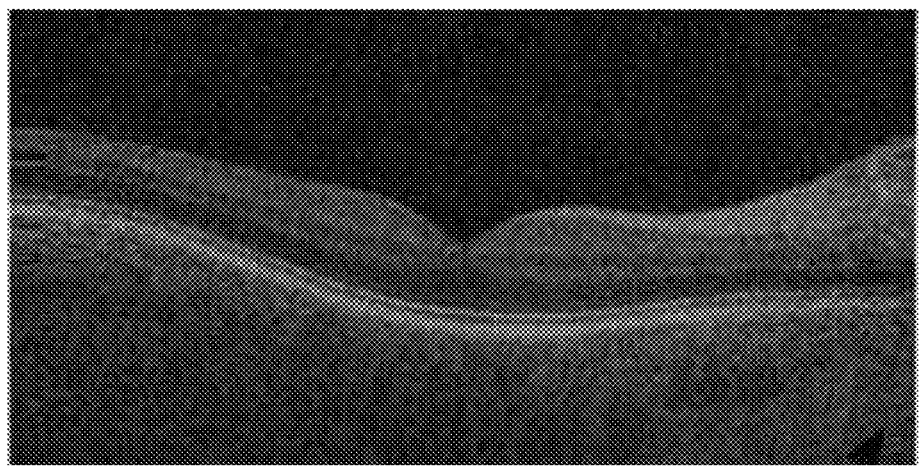
FIG. 12(b) shows, for comparison, a B-scan image generated by conventionally combining the A-scans in an acquired sequence of A-scans.

FIGS. 12(a) and 12(b) show examples of an OCT B-scan image generated with and without using a look-up table as described herein, respectively. In the example of FIG. 12(a), the same look-up table was used as in the example of FIG. 7. It can be seen that, with no transformation (FIG. 12(b)), the left- and right-hand sides of the B-scan image show warping artefacts. These artefacts are absent in the B-scan image of FIG. 12(a), which was generated using the look-up table.

The example aspects described herein avoid limitations, specifically rooted in computer technology, relating to conventional image processing systems and methods that generate dewarped B-scan images in a computationally inefficient manner. By virtue of the example aspects described herein, dewarped B-scan images can be generated in a more highly computationally efficient manner relative to the conventional systems and methods. At least some example aspects herein provide a look-up table that provides a single-step transformation taking into account different approaches to scan artefact removal. Such example aspects are well-suited to parallelism, allowing dewarped OCT B-scan images to be generated with greater computational efficiency relative to conventional approaches. Also, by virtue of the foregoing capabilities of the example aspects described herein, which are rooted in computer technology, the example aspects described herein improve also improve the fields of imaging processing and imaging processing devices.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized (and navigated) in ways other than those shown in the accompanying figures.

Software embodiments of the examples presented herein may be provided as a computer program, or software, such as one or more programs having instructions or sequences of instructions, included or stored in an article of manufacture such as a machine-accessible or machine-readable medium, an instruction store, computer-readable storage medium or computer-readable storage device, each of which can be non-transitory, in one example embodiment. The program or instructions on the non-transitory machine-accessible medium, machine-readable medium, instruction store, computer-readable storage medium, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g. program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the invention, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatus and computer programs described herein may be embodied in other specific forms without departing from the characteristics thereof. The foregoing embodiments are illustrative rather than limiting of the described systems and methods. Scope of the apparatus and computer programs described herein is thus indicated by the appended claims, rather than the foregoing description, and changes that come within the meaning and range of equivalency of the claims are embraced therein.

The invention claimed is:

1. A computer-implemented method of generating a look-up table for constructing a dewarped B-scan image from A-scans of a cropped part of a sequence of A-scans acquired by an optical coherence tomography, OCT, imaging apparatus, wherein the look-up table associates each of a plurality of pixel arrays that are to form the dewarped B-scan image with a respective one of the A-scans in the cropped part of the sequence of A-scans, the method comprising:
  receiving an indication of a spatial distribution of scan locations of the A-scans acquired by the OCT imaging apparatus;
  receiving cropping information in accordance with which the cropped part of the sequence of A-scans is cropped from the sequence of A-scans acquired by the OCT imaging apparatus;
  using the received indication to determine a dewarp function for selecting, from among the A-scans acquired by the OCT imaging apparatus, A-scans that have been acquired at substantially uniformly spaced scan locations; and
  generating the look-up table by:
    using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced; and
    storing, for each of the pixel arrays, a respective pixel array identifier of the pixel array in association with a respective A-scan identifier of the selected A-scan.

2. The computer-implemented method according to claim 1, comprising receiving, as the indication of the spatial distribution of scan locations of the A-scans acquired by the OCT imaging apparatus:
  values of at least one OCT scan control parameter that determine a scan pattern according to which the OCT imaging apparatus is controlled to acquire the sequence of A-scans; or
  measurements of a displacement of at least one scanning element of the OCT imaging apparatus that are indicative of respective scan locations of the A-scans acquired by the OCT imaging apparatus.

3. The computer-implemented method according to claim 1, further comprising:
  receiving an indication of a number of the pixel arrays that are to form the dewarped B-scan image,
  wherein the look-up table is generated by:
    calculating, based on the received indication of the number of the pixel arrays that are to form the dewarped B-scan image and the received cropping information, a number of pixel arrays that are to form an uncropped dewarped B-scan image;
    generating an uncropped look-up table by:
      using the calculated number of pixel arrays and the determined dewarp function to select, for each of the pixel arrays that are to form the uncropped dewarped B-scan image, a respective A-scan from the A-scans in the sequence of A-scans, such that the selected A-scans have scan locations that are substantially uniformly spaced; and
      storing, for each of the pixel arrays that are to form the uncropped dewarped B-scan image, a respective pixel array identifier of the pixel array in association with a respective A-scan identifier of the selected A-scan so as to generate the uncropped look-up table; and
    cropping the uncropped look-up table in accordance with the cropping information to generate the look-up table.

4. The computer-implemented method according to claim 1, further comprising using the generated look-up table to construct the dewarped B-scan image from A-scans of the cropped part of the sequence of A-scans by:
  receiving the sequence of A-scans from the OCT imaging apparatus;

using the look-up table to select, for each of the plurality of pixel arrays that are to form the dewarped B-scan image, a respective one of the A-scans in the received sequence of A-scans; and
populating the pixel arrays with pixel data based on the respectively selected A-scans to generate the dewarped B-scan image.

5. The computer-implemented method according to claim 1, further comprising using the generated look-up table to construct the dewarped B-scan image from A-scans of the cropped part of the sequence of A-scans by:
receiving the sequence of A-scans from the OCT imaging apparatus;
using the look-up table to select, for each of the plurality of pixel arrays that are to form the dewarped B-scan image, a respective one of the A-scans in the received sequence of A-scans;
calculating, for each pixel array of the plurality of pixel arrays that are to form the dewarped B-scan image, an averaged A-scan by averaging a predetermined number of nearest neighbour A-scans to the A-scan selected for the pixel array; and
populating the pixel arrays with pixel data based on the respectively calculated averaged A-scans to generate the dewarped B-scan image.

6. The computer-implemented method according to claim 5, wherein the averaged A-scan is calculated, for each pixel array of the plurality of pixel arrays that are to form the dewarped B-scan image, as a weighted average of the predetermined number of nearest neighbour A-scans to the A-scan selected for the pixel array.

7. A non-transitory storage medium storing computer-readable instructions which, when executed by a processor, cause the processor to perform a method of generating a look-up table for constructing a dewarped B-scan image from A-scans of a cropped part of a sequence of A-scans acquired by an optical coherence tomography, OCT, imaging apparatus, wherein the look-up table associates each of a plurality of pixel arrays that are to form the dewarped B-scan image with a respective one of the A-scans in the cropped part of the sequence of A-scans, the method comprising:
receiving an indication of a spatial distribution of scan locations of the A-scans acquired by the OCT imaging apparatus;
receiving cropping information in accordance with which the cropped part of the sequence of A-scans is cropped from the sequence of A-scans acquired by the OCT imaging apparatus;
using the received indication to determine a dewarp function for selecting, from among the A-scans acquired by the OCT imaging apparatus, A-scans that have been acquired at substantially uniformly spaced scan locations; and
generating the look-up table by:
using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced; and
storing, for each of the pixel arrays, a respective pixel array identifier of the pixel array in association with a respective A-scan identifier of the selected A-scan.

8. An apparatus configured to generate a look-up table for constructing a dewarped B-scan image from A-scans of a cropped part of a sequence of A-scans acquired by an optical coherence tomography, OCT, imaging apparatus, wherein the look-up table associates each of a plurality of pixel arrays that are to form the dewarped B-scan image with a respective one of the A-scans in the cropped part of the sequence of A-scans, the apparatus comprising:
a receiver module configured to receive:
an indication of a spatial distribution of scan locations of the A-scans acquired by the OCT imaging apparatus; and
cropping information in accordance with which the cropped part of the sequence of A-scans is cropped from the sequence of A-scans acquired by the OCT imaging apparatus;
a dewarp function generator module configured to use the received indication to determine a dewarp function for selecting, from among the A-scans acquired by the OCT imaging apparatus, A-scans that have been acquired at substantially uniformly spaced scan locations; and
a look-up table generator module configured to generate the look-up table by:
using the determined dewarp function and the received cropping information to select, for each of the pixel arrays, a respective A-scan from the A-scans in the sequence of A-scans, such that the selected A-scans are selected from the cropped part of the sequence of A-scans and have scan locations that are substantially uniformly spaced; and
storing in a memory, for each pixel array of the pixel arrays, a respective pixel array identifier of the pixel array in association with a respective A-scan identifier of the selected A-scan.

9. The apparatus according to claim 8, wherein the receiver module is configured to receive, as the indication of the spatial distribution of scan locations of the A-scans acquired by the OCT imaging apparatus:
values of at least one OCT scan control parameter that determine a scan pattern according to which the OCT imaging apparatus is controlled to acquire the sequence of A-scans; or
measurements of a displacement of at least one scanning element of the OCT imaging apparatus that are indicative of respective scan locations of the A-scans acquired by the OCT imaging apparatus.

10. The apparatus according to claim 8, wherein:
the receiver module is further configured to receive an indication of a number of the pixel arrays that are to form the dewarped B-scan image; and
the look-up table generator module is configured to generate the look-up table by:
calculating, based on the received indication of the number of the pixel arrays that are to form the dewarped B-scan image and the received cropping information, a number of pixel arrays that are to form an uncropped dewarped B-scan image;
generating an uncropped look-up table by:
using the calculated number of pixel arrays and the determined dewarp function to select, for each of the pixel arrays that are to form the uncropped dewarped B-scan image, a respective A-scan from the A-scans in the sequence of A-scans, such that the selected A-scans have scan locations that are substantially uniformly spaced; and
storing in the memory, for each pixel array of the pixel arrays that are to form the uncropped dewarped B-scan image, a respective pixel array identifier of the pixel array in association with a respective A-scan identifier of the selected A-scan; and cropping the uncropped look-up table in accordance with the cropping information to generate the look-up table.

11. The apparatus according to claim 8, further comprising a dewarped B-scan image generator configured to:

receive the sequence of A-scans from the OCT imaging apparatus; and construct the dewarped B-scan image from A-scans of the cropped part of the sequence of A-scans by:

using the generated look-up table to select, for each pixel array of the plurality of pixel arrays that are to form the dewarped B-scan image, a respective one of the A-scans in the received sequence of A-scans; and populating the pixel arrays with pixel data based on the respectively selected A-scans to generate the dewarped B-scan image.

12. The apparatus according to claim 8, further comprising a dewarped B-scan image generator configured to:

receive the sequence of A-scans from the OCT imaging apparatus; and construct the dewarped B-scan image from A-scans of the cropped part of the sequence of A-scans by:

using the look-up table to select, for each of the plurality of pixel arrays that are to form the dewarped B-scan image, a respective one of the A-scans in the received sequence of A-scans;

calculating, for each pixel array of the plurality of pixel arrays that are to form the dewarped B-scan image, an averaged A-scan by averaging a predetermined number of nearest neighbour A-scans to the A-scan selected for the pixel array; and populating the pixel arrays with pixel data based on the respectively calculated averaged A-scans so as to generate the dewarped B-scan image.

13. The apparatus according to claim 12, wherein the dewarped B-scan image generator is configured to calculate the averaged A-scan, for each pixel array of the plurality of pixel arrays that are to form the dewarped B-scan image, as a weighted average of the predetermined number of nearest neighbour A-scans to the A-scan selected for the pixel array.

14. The apparatus according to claim 11, wherein the dewarped B-scan image generator is a field-programmable gate array, FPGA.

15. The apparatus according to claim 14, wherein the FPGA is configured to use the generated look-up table to construct the dewarped B-scan image from A-scans of the cropped part of the sequence of A-scans by:

performing in parallel, for each of a plurality of sets of pixel arrays that are to form the dewarped B-scan image, processes of:

using the generated look-up table to select, for each pixel array in the set of pixel arrays, a respective one of the A-scans in the received sequence of A-scans; and populating the pixel arrays in the set of pixel arrays with pixel data based on the respectively selected A-scans to generate a respective section of the dewarped B-scan image; and combining the generated sections of the dewarped B-scan image so as to generate the dewarped B-scan image.

* * * * *